(12) United States Patent
Sasaki

(10) Patent No.: US 12,223,600 B2
(45) Date of Patent: Feb. 11, 2025

(54) INFORMATION PROCESSING APPARATUS, DISPLAY DEVICE, INFORMATION PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventor: Hirotake Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 641 days.

(21) Appl. No.: 17/157,940

(22) Filed: Jan. 25, 2021

(65) Prior Publication Data
US 2022/0084287 A1 Mar. 17, 2022

(30) Foreign Application Priority Data
Sep. 17, 2020 (JP) ................. 2020-156605

(51) Int. Cl.
| | | |
|---|---|---|
| *G06T 19/00* | (2011.01) | |
| *G06F 3/01* | (2006.01) | |
| *G06T 7/70* | (2017.01) | |
| *G06T 15/20* | (2011.01) | |
| *G06V 20/20* | (2022.01) | |

(52) U.S. Cl.
CPC .............. *G06T 19/00* (2013.01); *G06F 3/012* (2013.01); *G06T 7/70* (2017.01); *G06T 15/20* (2013.01); *G06V 20/20* (2022.01)

(58) Field of Classification Search
CPC ........... G06T 19/00; G06T 7/70; G06T 15/20; G06T 7/73; G06F 3/012; G06F 3/017; G06F 3/0304; G06F 3/011; G06F 2203/012; G06V 20/20
See application file for complete search history.

(56) References Cited

U.S. PATENT DOCUMENTS

| | | |
|---|---|---|
| 10,001,844 B2 | 6/2018 | Namba et al. |
| 10,732,797 B1 * | 8/2020 | Perez, III .............. G06F 3/0482 |
| 11,487,359 B2 | 11/2022 | Nakade et al. |
| 11,803,240 B2 | 10/2023 | Nakade et al. |

(Continued)

FOREIGN PATENT DOCUMENTS

| | | |
|---|---|---|
| JP | 2005107963 | 4/2005 |
| JP | 2005352738 | 12/2005 |

(Continued)

OTHER PUBLICATIONS

"Office Action of Japan Counterpart Application", issued on Mar. 5, 2024, with English translation thereof, p. 1-p. 6.

(Continued)

*Primary Examiner* — Jitesh Patel
(74) *Attorney, Agent, or Firm* — JCIPRNET

(57) ABSTRACT

Provided is an information processing apparatus including a processor configured to display, in a virtual space, plural objects, and an operation object for operating the objects, based on input information from a user, extract an object group from the plural objects, specify one object from the object group, according to an operation of the operation object in the virtual space, and display the one specified object in an identifiable manner with respect to other objects other than the one object.

16 Claims, 12 Drawing Sheets

(56) References Cited

U.S. PATENT DOCUMENTS

| | | | | |
|---|---|---|---|---|
| 2014/0351758 A1* | 11/2014 | Yoshida | ................ | G06F 3/0482 |
| | | | | 715/823 |
| 2015/0135132 A1* | 5/2015 | Josephson | ............. | H04W 4/021 |
| | | | | 715/784 |
| 2015/0350563 A1* | 12/2015 | Hendricks | .............. | H04N 21/47 |
| | | | | 348/598 |
| 2017/0109936 A1* | 4/2017 | Powderly | ................ | G06F 3/016 |
| 2023/0418376 A1 | 12/2023 | Nakade et al. | | |

FOREIGN PATENT DOCUMENTS

| | | |
|---|---|---|
| JP | 2017500673 | 1/2017 |
| JP | 2017059062 | 3/2017 |
| WO | 2015051047 | 4/2015 |
| WO | 2020110270 | 6/2020 |

OTHER PUBLICATIONS

Office Action of Japan Counterpart Application, with English translation thereof, issued on May 14, 2024, pp. 1-3.

\* cited by examiner

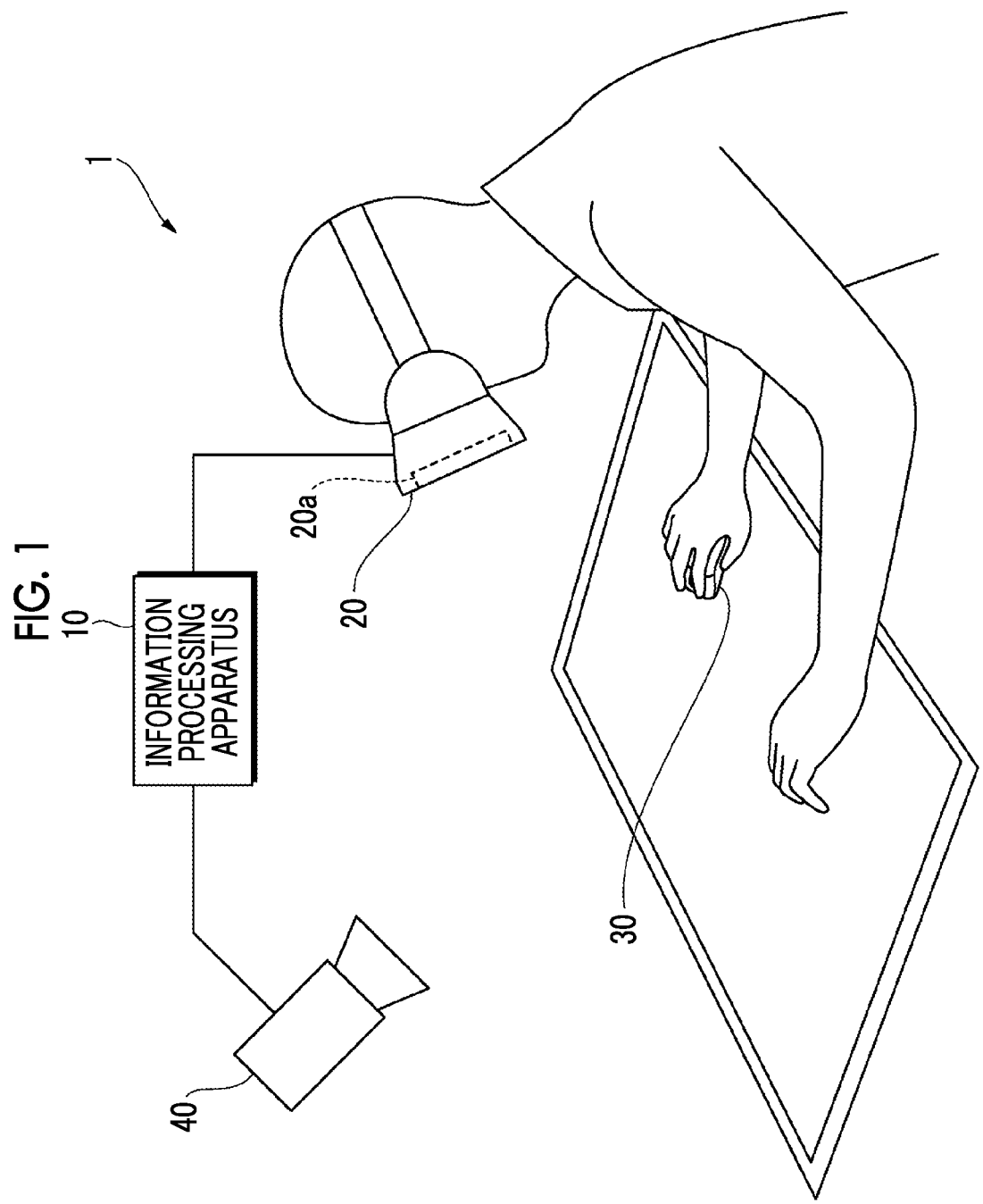

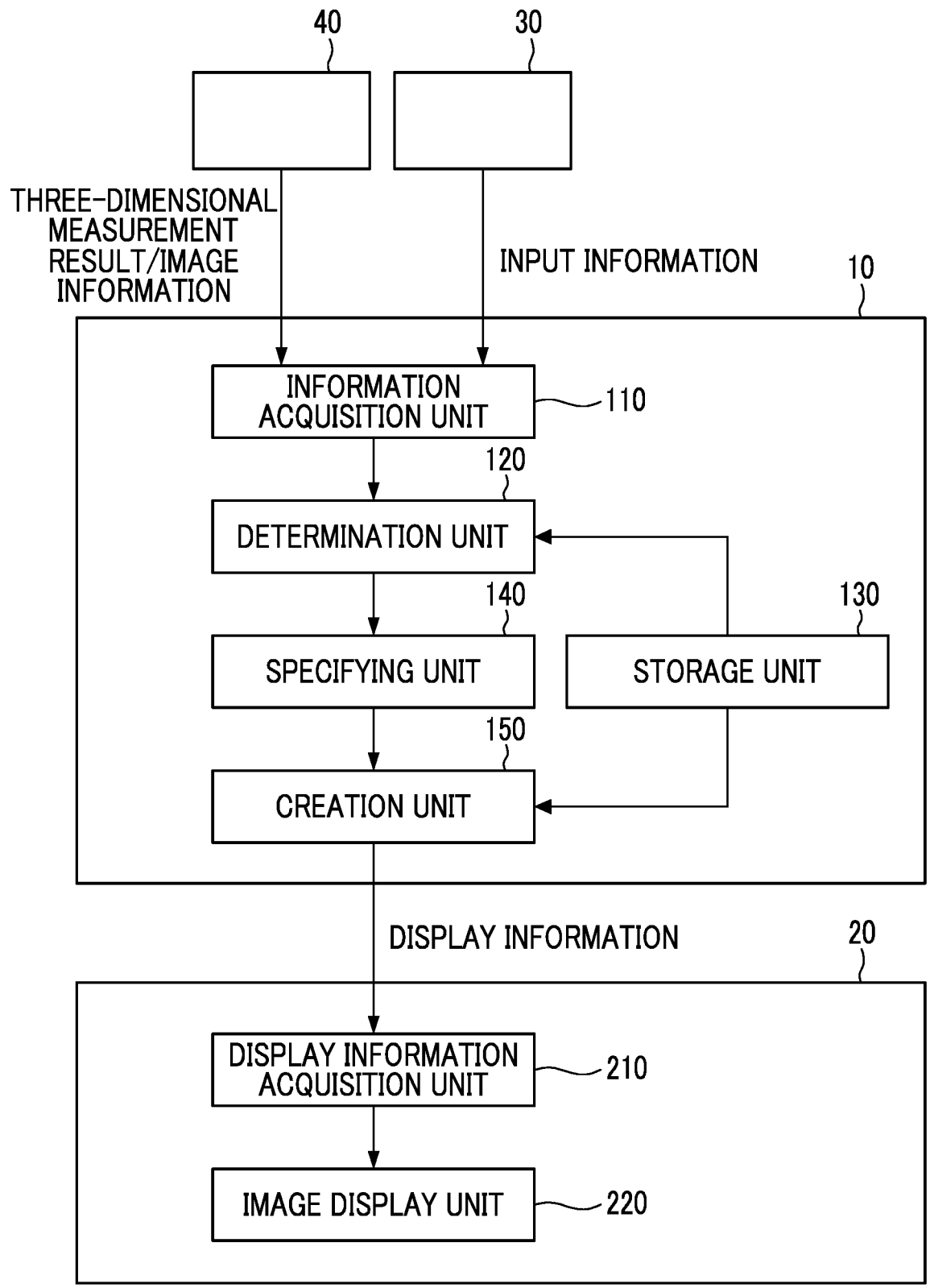

INFORMATION PROCESSING APPARATUS, DISPLAY DEVICE, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-156605 filed Sep. 17, 2020.

BACKGROUND

(i) Technical Field

The present invention relates to an information processing apparatus, a display device, an information processing system, and a non-transitory computer readable medium storing program.

(ii) Related Art

In the related art, there is a space expansion technology such as virtual reality (VR) in which a virtual space is created by a computer and users are allowed to experience behavior in this virtual space. In addition, as the space expansion technology, there are augmented reality (AR) for superposing a virtual space on an existing real space, on display or the like, mixed reality (MR) in which a real space and a virtual space are mixed, and real and virtual are influenced in real time, or the like.

In JP2005-352738A, in the pointing operation, there is a correlation between the peak speed during pointer movement and the distance to the target at that time, the distance from the peak speed to the target is obtained, and the target position is predicted from the pointer position and direction. By doing so, at the time of pointing operation, the system side can predict the position of the object to which the user wants to move the pointer before the operation is completed, so that the application indicated by the icon present at that location starts to start, and the work time is shortened. It is described to build a capable system.

Further, JP2005-107963A describes that an operation menu is displayed in the vicinity of the display position of the pointer, in response to a predetermined operation input from the user, on the screen on which the computer graphics and the pointer are displayed. Then, the operation instruction is given by instructing a intended item from this operation menu. Here, the operation menu has a ring shape in which a plurality of item areas for displaying items are disposed around the display position so as to surround the instructed position of the pointer, and the space between the plurality of item areas and the display position of the pointer becomes hollow.

Further, JP2017-059062A describes that an information processing apparatus includes a first detecting unit that detects the position and posture of the head of the user wearing a head-mounted display device, a first identification unit that identifies an input device used to execute a task, a second identification unit that identifies an operation medium, which is within a range of a field of view of a user, for the user to operate the input device, a second detecting unit that detects a first distance from a viewpoint position of the user to the input device, based on the position and posture of the head of the user, a third detecting unit that detects a second distance from the viewpoint position of the user to the operation medium, based on the position and posture of the head of the user, and a discriminating unit that determines a task to be executed, based on the first distance and the second distance.

SUMMARY

In a case where in the virtual space, a plurality of objects are displayed and the user tries to select one of the objects, in a case where the plurality of objects are disposed close to each other in the virtual space, an object different from the object that the user has intended may be selected. Therefore, in order for the user to select the object that the user has intended, it may be necessary to perform detailed operations such as accurately designating the position of the object.

Aspects of non-limiting embodiments of the present disclosure relate to an information processing apparatus, a display device, an information processing system, and a non-transitory computer readable medium storing program, which allow a user to easily select an intended object even in a case where a plurality of objects are disposed close to each other in a virtual space.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to display, in a virtual space, a plurality of objects, and an operation object for operating the objects, based on input information from a user, extract an object group from the plurality of objects, specify one object from the object group, according to an operation of the operation object in the virtual space, and display the one specified object in an identifiable manner with respect to other objects other than the one object.

BRIEF DESCRIPTION OF THE DRAWINGS

Exemplary embodiment(s) of the present invention will be described in detail based on the following figures, wherein:

FIG. 1 is a view illustrating a configuration example of an information processing system according to the present exemplary embodiment;

FIG. 3 is a block diagram illustrating a functional configuration example of an information processing apparatus and a display device according to the present exemplary embodiment.

DETAILED DESCRIPTION

Figure 2B:
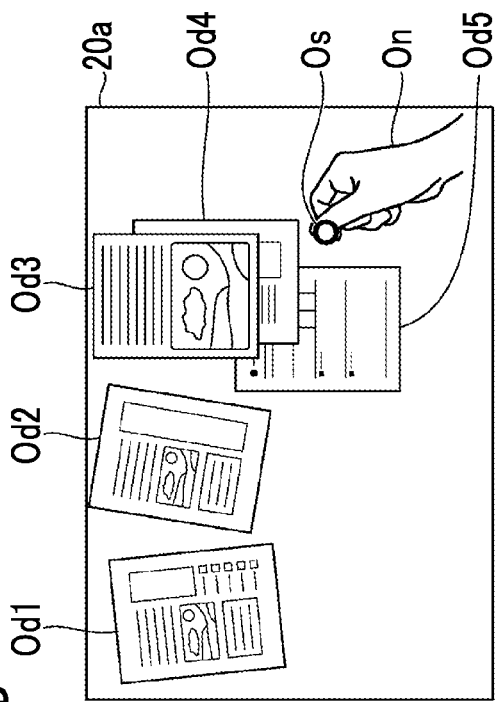
FIGS. 2A to 2C are views illustrating an example in a case where it becomes difficult to select a document object.

Hereinafter, an exemplary embodiment of the present invention will be described in detail with reference to the accompanying drawings.

Explanation of Entire Information Processing System

FIG. 1 is a view illustrating a configuration example of an information processing system 1 according to the present exemplary embodiment.

As illustrated FIG. 1, the information processing system 1 of the present exemplary embodiment includes an information processing apparatus 10 which creates display information, a display device 20 which displays an image on a display screen 20a based on display information, an input device 30 which inputs information, and a camera 40 which captures the user's head, the display device 20, and the input device 30.

The information processing apparatus 10 creates display information on a virtual reality space (VR space) to be displayed on the display screen 20a of the display device 20. As will be described in detail later, various objects are displayed on the display screen 20a of the display device 20. Examples of the displayed objects include a user head object representing the user's head, a display object representing the display screen 20a, an input device object representing the input device 30, a document object representing a document, a guide object that guides the movement of the input device object, and the like. Here, the "document" is an electronic document in which text information and image information are digitized. This electronic document is not particularly limited in terms of format, data structure, and the like as long as the electronic document can be handled by the information processing system 1. The objects displayed on the display screen 20a do not need to be actually present in the real space. In this case, the user head object representing the user's head, the display object representing the display screen 20a, and the input device object representing the input device 30 are present in the real space, but the document object representing a document does not need to be present in the real space. Further, the guide object that guides the movement of the input device object is not present in the real space.

Further, the information processing apparatus 10 calculates the position and posture of the user's head in the VR space, based on the information on the position and posture of the user's head detected in the real space, and uses the calculated position and posture to display the user head object. Similarly, the information processing apparatus 10 calculates the position and posture of the display screen 20a in the VR space, based on the information on the position and posture of the display device 20 detected in the real space, and uses the calculated position and posture to display the display object. Further, the information processing apparatus 10 calculates the position and posture of the input device 30 in the VR space, based on the information on the position and posture of the input device 30 detected in the real space, and uses the calculated position and posture to display the input device object. Here, the "real space" is a space in the real world, and the "virtual reality space (VR space)" is a three-dimensional space representing a world imitating the real world constructed on a computer.

Further, the document object can be disposed in the VR space at any position and posture, and can also reflect the result of the user's past operation, and the information processing apparatus 10 calculates the position and posture.

The information processing apparatus 10 is, for example, a so-called general-purpose personal computer (PC). Then, the information processing apparatus 10 processes the information of the present exemplary embodiment by operating various types of application software under the control of the Operating System (OS).

The information processing apparatus 10 includes a Central Processing Unit (CPU) as a calculation unit, a main memory as a memory unit, and storages such as a Hard Disk Drive (HDD) and a Solid State Drive (SSD). Here, the CPU is an example of a processor, and executes various types of software such as an OS (basic software) and application software. The main memory is a storage area for storing various types of software and data used for executing the software, and the storage is a storage area for storing input data for various types of software and output data from various types of software.

In addition, the information processing apparatus 10 includes a communication interface for communicating with the outside.

The display device 20 displays the VR space described above. The display device 20 is, for example, a binocular head-mounted display (HMD). That is, the user wears the head-mounted display on the head, and sees the image displayed on the display screen 20a disposed in front of the user inside the head-mounted display. The display screen 20a is configured with, for example, a device having a function of displaying an image, such as a liquid crystal display or an organic electroluminescence display (OELD).

In the present exemplary embodiment, the display device 20 displays a VR space for viewing and operating a document on the display screen 20a. In addition, the display screen 20a can present parallax, and the user can recognize the VR space three-dimensionally such as depth.

The input device 30 operates an object present in the VR space. The input device 30 is not particularly limited as long as the input device can input information. Further, the input device 30 may be a physically existing object, or may be a user's hand or finger. In a case where the input device 30 is a physically existing object, the input device 30 is, for example, a mouse-type, pen-type, or keyboard-type input device. In a case where the input device 30 is a mouse-type input device capable of detecting a three-dimensional position, the input device 30 moves in a space to move a cursor, select a button, and the like. FIG. 1 illustrates a case where a user uses a mouse-type input device as the input device 30. Further, in a case where the input device 30 is a pen-type input device, the user can hold the input device in his/her hand, operate the input device like a pen, and perform writing. The shape is pen-shaped, and information input such as writing texts and figures can be performed. The pen-type input device may be a stylus pen or the like, or may be a pen with which writing can actually be performed, such as a ballpoint pen, a pencil, or a fountain pen. Further, the keyboard-type input device has a plurality of keys which are pressed for inputting information. Therefore, the keyboard-type input device 30 may be an actual keyboard.

In a case where the input device 30 is a user's hand or finger, a camera 40 equipped with an RGB camera, a depth sensor, or the like, such as Microsoft's Kinect (registered trademark), capture a picture. Then, the information processing apparatus 10 can acquire the three-dimensional coordinates of the user's hand or finger by analyzing the movement of the user's hand or finger.

Further, the number of input devices 30 may be one or plural. Further, the input device 30 may be able to not only operate an object present in the VR space but also, for example, start or end a specific mode, by transmitting an operation signal. The operation signal may be transmitted by a physical button operation or by recognizing a gesture by the user's hand or finger.

The camera 40 includes, for example, an optical system that converges incident light, and an image sensor that detects the light converged by the optical system.

The optical system is configured with a single lens or a combination of a plurality of lenses. In the optical system, various aberrations are removed by the combination of lenses and the coating applied to the lens surface. The image sensor is configured by arranging image pickup elements such as a Charge Coupled Device (CCD) and a Complementary Metal Oxide Semiconductor (CMOS).

The camera 40 captures the user's head, the display device 20, and the input device 30. The camera 40 further includes, for example, an RGB camera, a depth sensor, and the like, thereby sensing an object to be captured and performing three-dimensional measurement. Thus, the information processing apparatus 10 can calculate the positions and postures of the user's head, the display device 20, and the input device 30. The camera 40 is not particularly limited, and a commercially available camera 40 can be used. For example, Leap Motion (registered trademark) of Leap Motion, RealSense (registered trademark) of Intel, Kinect of Microsoft, or the like can be used.

Further, markers may be provided on the user's head, the display device 20 and the input device 30, and the positions and postures may be determined based on the captured image of the markers. The "marker" is derived from something. More specifically, the "marker" is, for example, an array of light emitting devices such as LEDs disposed in a specified three-dimensional shape. Further, the marker may be printed on a flat surface such as a one-dimensional barcode or a two-dimensional barcode. The mounting position of the marker is predetermined and is held by the information processing apparatus 10. The marker has unique ID number information, which allows each of the user's head, the display device 20, and the input device 30 to be distinguished.

The information processing apparatus 10 and the display device 20 are connected via, for example, a Digital Visual Interface (DVI). In addition, instead of DVI, connection may be made via High-Definition Multimedia Interface (HDMI (registered trademark)), DisplayPort, or the like.

Further, the information processing apparatus 10 and the input device 30 are connected via, for example, Universal Serial Bus (USB). In addition, instead of USB, connection may be made via IEEE1394, RS-232C, or the like. However, without being limited to this, a wireless connection such as a wireless Local Area Network (LAN) or Bluetooth (registered trademark) may be used.

Further, the information processing apparatus 10 and the camera 40 are connected by wire in the illustrated example, and are connected via, for example, USB, IEEE1394, and RS-232C. Thus, the image information on the image captured by the camera 40 is sent to the information processing apparatus 10 by wire. However, without being limited to this, the wireless connection described above may be used.

In such an information processing system 1, the user processes a document by operating the document object in the VR space by using the input device 30 while looking at the display screen 20*a*. The processing of a document includes, for example, creating a document, selecting a document, viewing a document, modifying a document, and deleting a document.

However, it may be difficult to select a document, in a case where the document objects are located close to each other in the VR space, such as in a case where a plurality of document objects overlap.

Figure 2C:
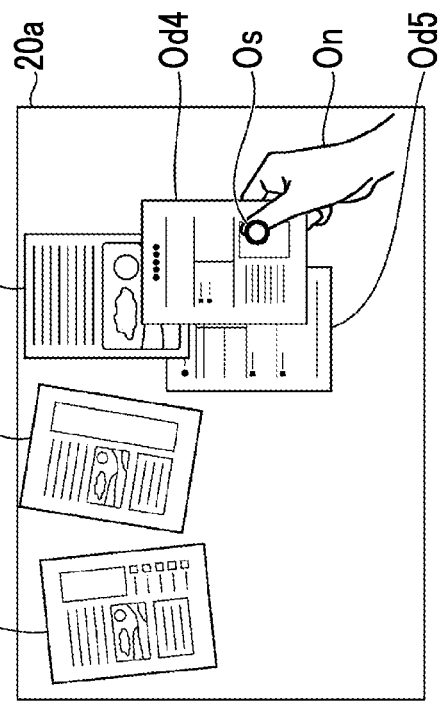
Figure 2A:
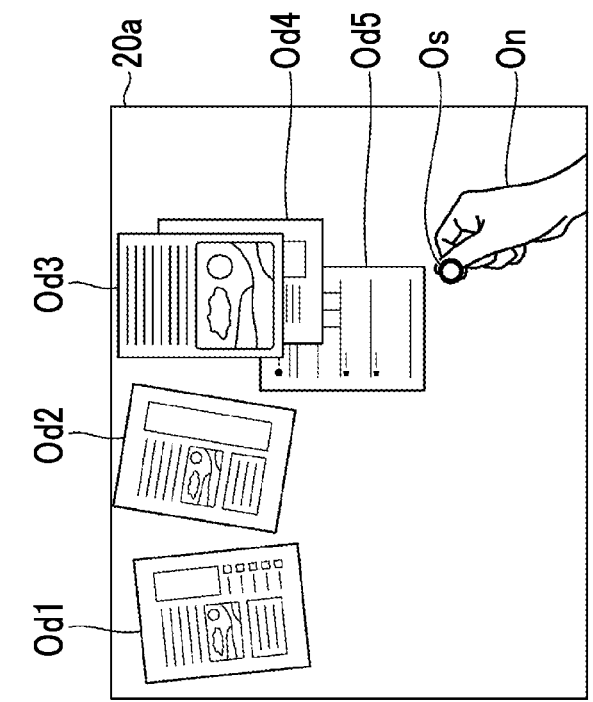

FIGS. 2A to 2C are views illustrating an example in a case where it becomes difficult to select a document object.

Of these, FIG. 2A illustrates the state before the selection of the document object is performed.

In the illustrated example, the document objects Od1 to Od5 are displayed on the display screen 20*a*. Further, the object of the user's hand is displayed as the input device object On. Then, the operation object Os is displayed on the input device object On. The operation object Os represents a part of the input device object On for operating the object. This operation object Os occupies a certain range in the VR space. In this case, the operation object Os can be said to be a pointer. Therefore, for example, in a case where the document object Od5 is tried to be selected, the user adjusts the operation object Os to the document object Od5 and performs a predetermined operation by using the input device 30. When the input device 30 is a mouse-type input device, this operation is, for example, an operation such as clicking. In a case where the input device 30 is a user's hand or finger, this operation is a predetermined gesture.

Here, the document objects Od1 to Od5, which are examples of a plurality of objects, are displayed in the VR space. Then, the operation object Os for operating the objects, based on input information from the user is displayed in the VR space. The "input information" is information that is input to the information processing apparatus 10 as a user's instruction, when an operation such as a click or a gesture described above is performed.

Then, from the state of FIG. 2A, the user brings the input device object On closer to the document object Od5 and selects the document object Od5 as illustrated in FIG. 2B. However, in this case, as illustrated in FIG. 2C, the adjacent document object Od4 may be selected. That is, even in a case where one is tried to be selected from among the plurality of document objects Od1 to Od5, by using the input device 30, another adjacent document object may be selected, due to a slight positional deviation of the operation object Os in the VR space. Further, since the pages configuring a document are located close to each other in the same document, a similar thing can happen in a case where selecting a page.

Therefore, in the present exemplary embodiment, the information processing system 1 has the following configuration to suppress this problem.

Explanation of Information Processing Apparatus 10 and Display Device 20

FIG. 3 is a block diagram illustrating a functional configuration example of the information processing apparatus 10 and the display device 20 according to the present exemplary embodiment. Further, in FIG. 3, among various functions of the information processing apparatus 10 and the display device 20, functions related to the present exemplary embodiment are selected and illustrated.

As illustrated, the information processing apparatus 10 of the present exemplary embodiment includes an information acquisition unit 110 which acquires a three-dimensional measurement result and image information from the camera 40, a determination unit 120 which determines the position and posture of the user's head, the display device 20, and the input device 30 in real space, a storage unit 130 which stores the sizes and shapes of the user's head, the display device 20 and the input device 30, or information about an object, a specifying unit 140 which specifies a document object, and a creation unit 150 which creates display information to be displayed on the display screen 20*a* of the display device 20.

The information acquisition unit 110 acquires these three-dimensional measurement results and image information, from the camera 40 that captures the user's head, the display device 20, and the input device 30.

In this case, the camera 40 captures the user's head, the display device 20, and the input device 30 present in the real space as illustrated in FIG. 1. Then, the three-dimensional measurement result and information on a captured image are sent from the camera 40 to the information processing apparatus 10 and acquired by the information acquisition unit 110. In this case, the image information is image information on a moving image, but the image information may be, for example, image information on a plurality of still images captured at predetermined short time intervals such as every 40 milliseconds.

Further, the information acquisition unit 110 acquires input information from the input device 30.

The determination unit 120 determines the positions and postures of the user's head, the display device 20, and the input device 30. In this case, the determination unit 120 recognizes the user's head, the display device 20, and the input device 30 from the three-dimensional measurement results, and determines the positions and postures thereof. In a case where markers are used, the positions and postures are determined based on the image information of the markers.

The storage unit 130 holds the ID numbers and the sizes and shapes in the real space, and the like of the user's head, the display device 20, and the input device 30. Regarding the sizes and shapes, the storage unit 130 can hold the shape as, for example, three-dimensional coordinates or a 3D model expressing the shape by a mathematical expression using the three-dimensional coordinates. In a case where markers are used, the mounting positions of the markers are held.

Further, the storage unit 130 stores information about an object to be displayed in the VR space. The information about the object is, for example, information on the size and shape of the object, in which the shape is expressed by three-dimensional coordinates or a mathematical expression using the three-dimensional coordinates, and may include attribute information representing the characteristics of the object. The information representing this characteristic may be information representing the texture of the surface, information representing the weight, information representing the hardness, or the like. In a case where the object is a document object Od, information about the contents of the document is stored. That is, the text information and the image information included in the document are stored.

The specifying unit 140 specifies one document object Od, according to the operation of the operation object Os in the VR space. Although the details will be described later, the specification is performed by distinguishing one document object Od from the other document objects Od, according to the position of the operation object Os in the VR space.

The creation unit 150 disposes the 3D models of the user's head, the display device 20, and the input device 30 in the VR space as the user head object, the display object, and the input device object On, and creates display information. In this case, in the VR space, each object is preferably disposed, for example, at the same position and posture as in the real space. Further, each object is preferably disposed, for example, in the same size and shape as in the real space. However, the size and shape may be changed without being limited to this. Further, it is not always necessary to match the colors in the VR space and the real space.

Further, the creation unit 150 disposes other objects such as the document object Od in the VR space, and creates display information. In this case, the contents of the document is displayed on the display surface of the document object Od. Further, as will be described in detail later, when the user wants to select the document object Od, the creation unit 150 creates display information for displaying one document object Od in an identifiable manner with respect to another document object Od.

Further, as illustrated in FIG. 3, the display device 20 includes a display information acquisition unit 210 that acquires display information, and an image display unit 220 that displays an image, based on the display information.

The display information acquisition unit 210 acquires the image information created by the creation unit 150. Further, the image display unit 220 displays an image, based on the image information created by the creation unit 150. The image display unit 220 is, for example, the display screen 20*a* described above.

Therefore, the screen displayed by the display device 20 is the above-described VR space, and the image display unit 220 displays the above-described object in the VR space.

Explanation of Operation of Information Processing System 1

Next, the operation of the information processing system 1 will be described.

Figure 4:
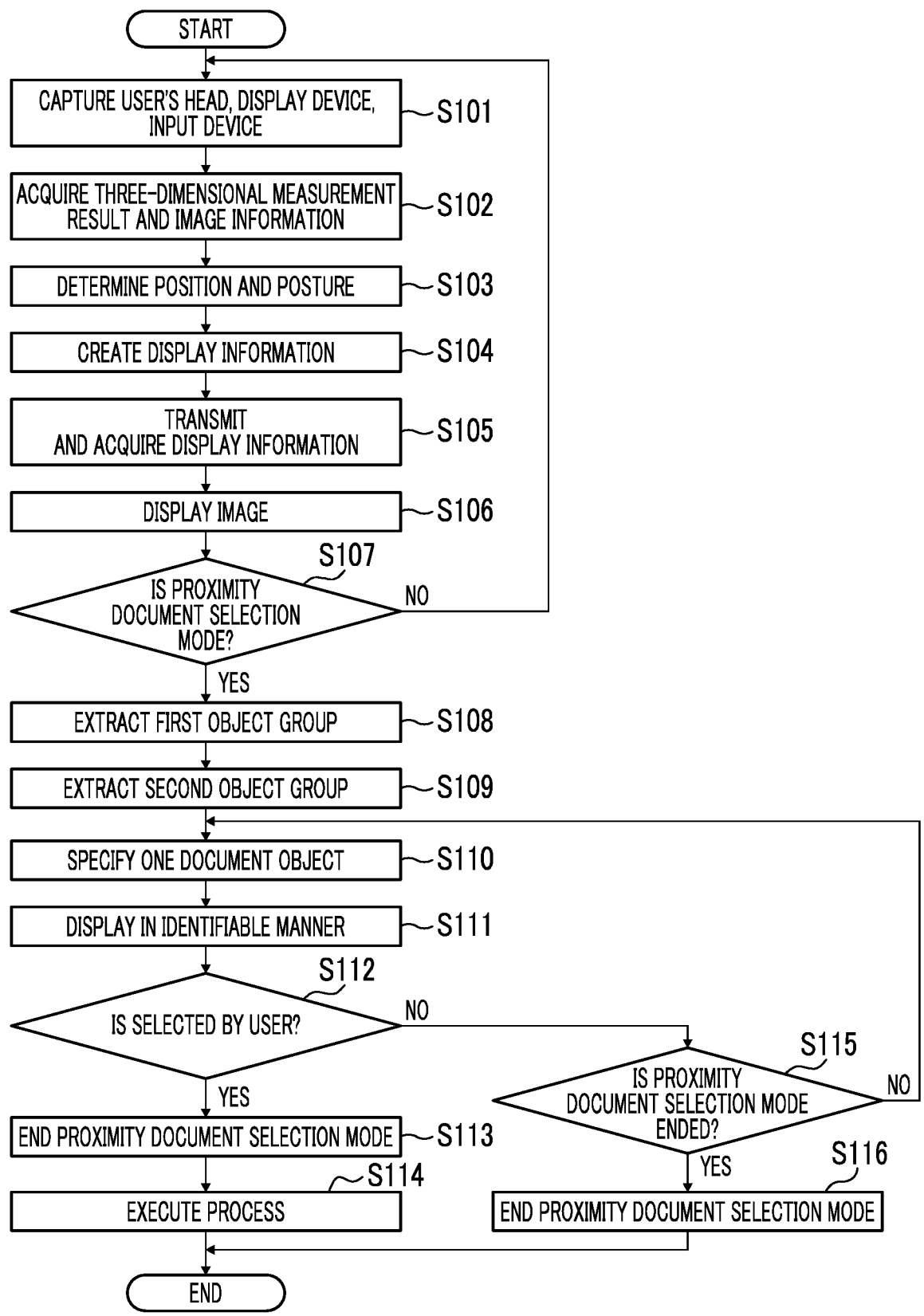
FIG. 4 is a flowchart illustrating the operation of the information processing system.

FIG. 4 is a flowchart illustrating the operation of the information processing system 1.

First, the camera 40 captures the user's head, the display device 20, and the input device 30 (step S101). Then, the three-dimensional measurement result and the information on the captured image are sent to the information processing apparatus 10.

The information acquisition unit 110 of the information processing apparatus 10 acquires the three-dimensional measurement result and the image information (step S102).

Next, the determination unit 120 determines the positions and postures of the user's head, the display device 20, and the input device 30 in the real space, based on the three-dimensional measurement results and the image information acquired by the information acquisition unit 110 (step S103).

Figure 5:
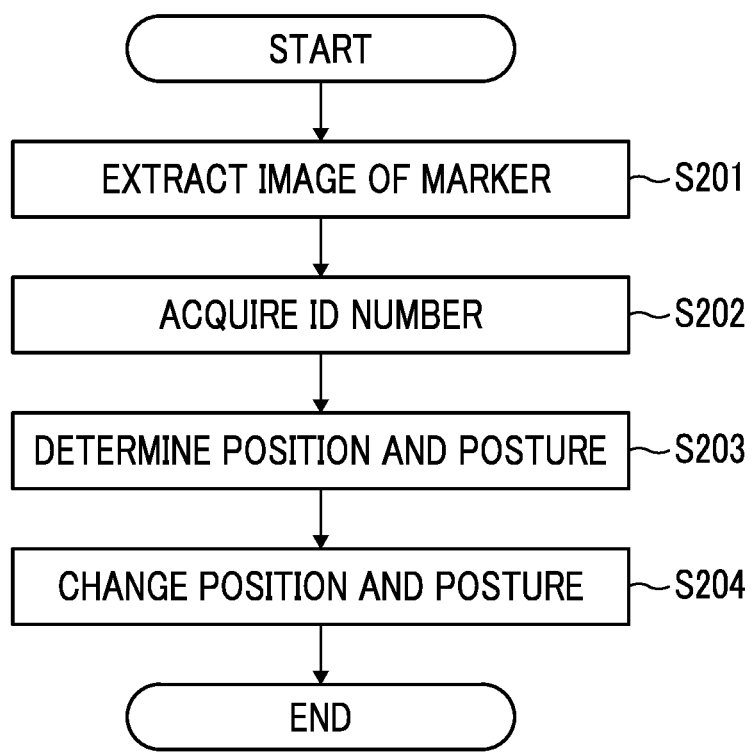
FIG. 5 is a flowchart illustrating a process in which a determination unit determines a position and a posture of an input device or the like based on a position of a marker.

FIG. 5 is a flowchart illustrating a process in which the determination unit 120 determines the position and posture of the input device 30 or the like based on the position of a marker. FIG. 5 is a flowchart illustrating the process of step S103 of FIG. 4 in more detail.

Here, first, a marker is extracted from the image (step S201). In this case, in a case where there are a plurality of markers, the image of each marker is extracted.

Then, the ID number is acquired from the extracted marker (step S202).

Further, the position and posture of the input device and the like are determined, based on the size and deformation state of the marker in the captured image (step S203).

Then, information on the position and posture of the input device 30 or the like corresponding to the ID number is updated (step S204).

Returning to FIG. 4, the creation unit 150 creates display information to be displayed in the VR space, based on the positions and postures obtained by the determination unit 120 and the information on the object stored in the storage unit 130 (step S104).

Then, the creation unit 150 transmits the created display information to the display device 20, and the display information acquisition unit 210 of the display device 20 acquires the created display information (step S105).

Then, the image display unit 220 displays an image on the display screen 20a, based on the display information (step S106). Thus, objects such as the user head object, the display object, the input device object On, and the document object Od are displayed in the VR space.

Next, the specifying unit 140 determines whether or not the proximity document selection mode is entered by the user's operation (step S107). The proximity document selection mode is a mode used in a case of selecting one document object Od from a plurality of adjacent document objects Ods, and this mode can be entered by the user performing a predetermined operation. This operation is, for example, a button operation or a gesture operation. It is preferable to clearly indicate to the user whether or not the proximity document selection mode is entered, for example. For example, the color or shape of the input device object On or the operation object Os is changed, or an object such as a text or an icon indicating that this mode is entered is displayed near these objects. The proximity document selection mode ends when the user makes a document selection. Further, this mode may be ended when the user performs a predetermined operation for ending this mode. This operation is, for example, a button operation or a gesture operation.

As a result, in a case where the proximity document selection mode is not entered (No in step S107), the process returns to step S101.

On the other hand, in the proximity document selection mode (Yes in step S107), the specifying unit 140 extracts a object group from a plurality of document objects Od in the VR space. The "object group" is a collection of objects, and here, is the first object group and the second object group described below.

In this case, first, the specifying unit 140 extracts the first object group G1 from the plurality of document objects Od in the VR space (step S108).

Further, the specifying unit 140 extracts the second object group G2 from the first object group G1, according to the position of the operation object Os (step S109).

Figure 6:
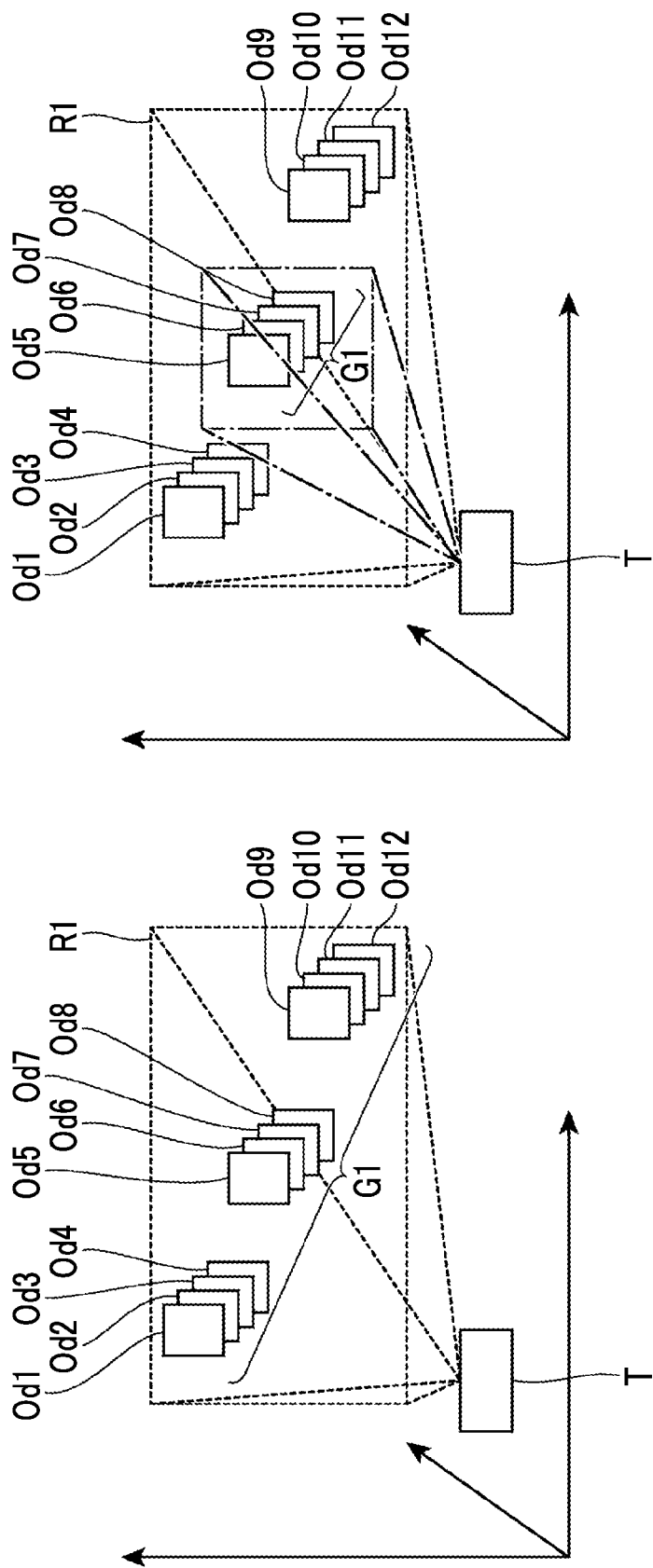
FIGS. 6A and 6B are views illustrating a first object group extracted in step S108 of FIG. 4.

FIGS. 6A and 6B are views illustrating a first object group G1 extracted in step S108 of FIG. 4.

The specifying unit 140 extracts the document object Od in a user's visible range R1, as the first object group G1. The specifying unit 140 calculates the user's visible range R1, based on the position and posture of the head T of the user. Then, the specifying unit 140 selects the document object Od included in this range R1, as the first object group G1.

This range R1 can be the entire area displayed on the display screen 20a. FIG. 6A illustrates a case where the entire area displayed on the display screen 20a is set to the user's visible range R1. Then, it is illustrated that as the document objects Od in the range R1, the document objects Od1 to Od12 are extracted as the first object group G1.

Further, the range R1 may be a part of the area displayed on the display screen 20a. FIG. 6B illustrates a case where a part of the area displayed on the display screen 20a is set to the user's visible range R1. Then, it is illustrated that the document objects Od5 to Od8 in this range R1 are extracted as the first object group G1.

Figure 7:
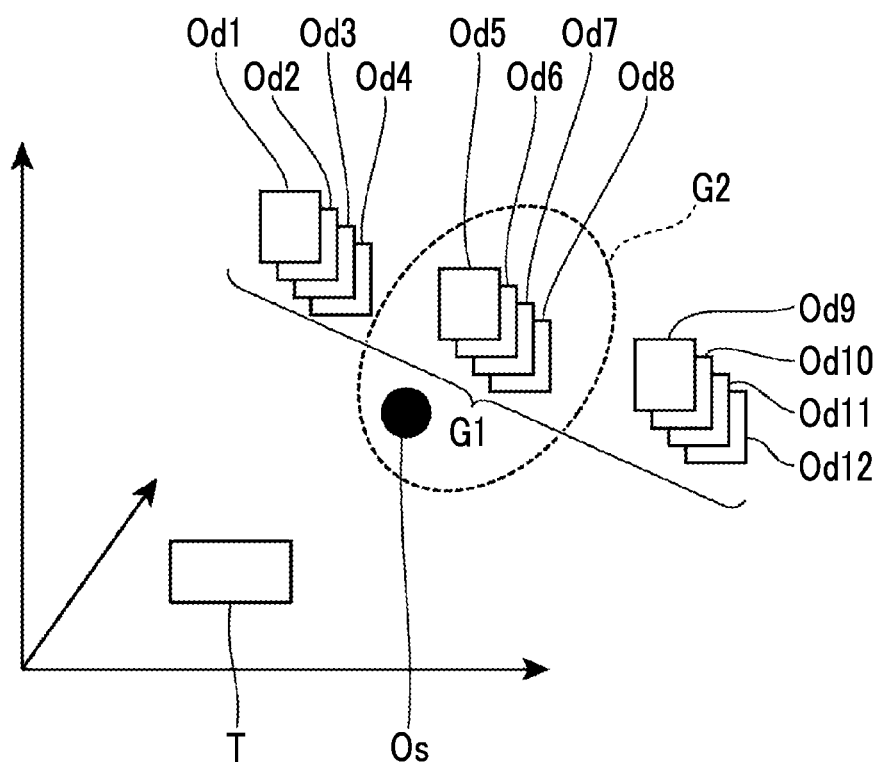
FIG. 7 is a view illustrating a second object group extracted in step S109 of FIG. 4.

FIG. 7 is a view illustrating a second object group G2 extracted in step S109 of FIG. 4.

Here, the case where the specifying unit 140 selects the second object group G2, from the state of FIG. 6A is illustrated. The specifying unit 140 extracts the second object group G2 from the document object Od, according to the position of the operation object Os.

Here, it is illustrated that the document objects Od5 to Od8 are selected as the second object group G2, from the document objects Od1 to Od12 which are the first object group G1. That is, in this case, the document objects Od5 to Od8 that are close to the position of the operation object Os are selected as the second object group G2. In this case, it is determined whether or not the document objects are close to each other is determined by the Euclidean distance in the VR space. That is, in this case, the document objects Od having relatively small Euclidean distances from the position of the operation object Os in the VR space are selected as the second object group G2.

Returning to FIG. 4, the specifying unit 140 specifies one document object Od from the second object group G2, according to the operation of the operation object Os in the VR space (step S110). Specifically, the specifying unit 140 specifies the closest document object Od from the second object group G2, according to the movement of the operation object Os.

Then, the creation unit 150 displays one specified document object Od in an identifiable manner with respect to other document objects Od other than the document object Od (step S111). Specifically, the creation unit 150 creates display information for displaying one document object Od specified by the specifying unit 140 by sequentially moving the one document object Od with respect to other document objects Od other than the document object Od.

Figure 8:
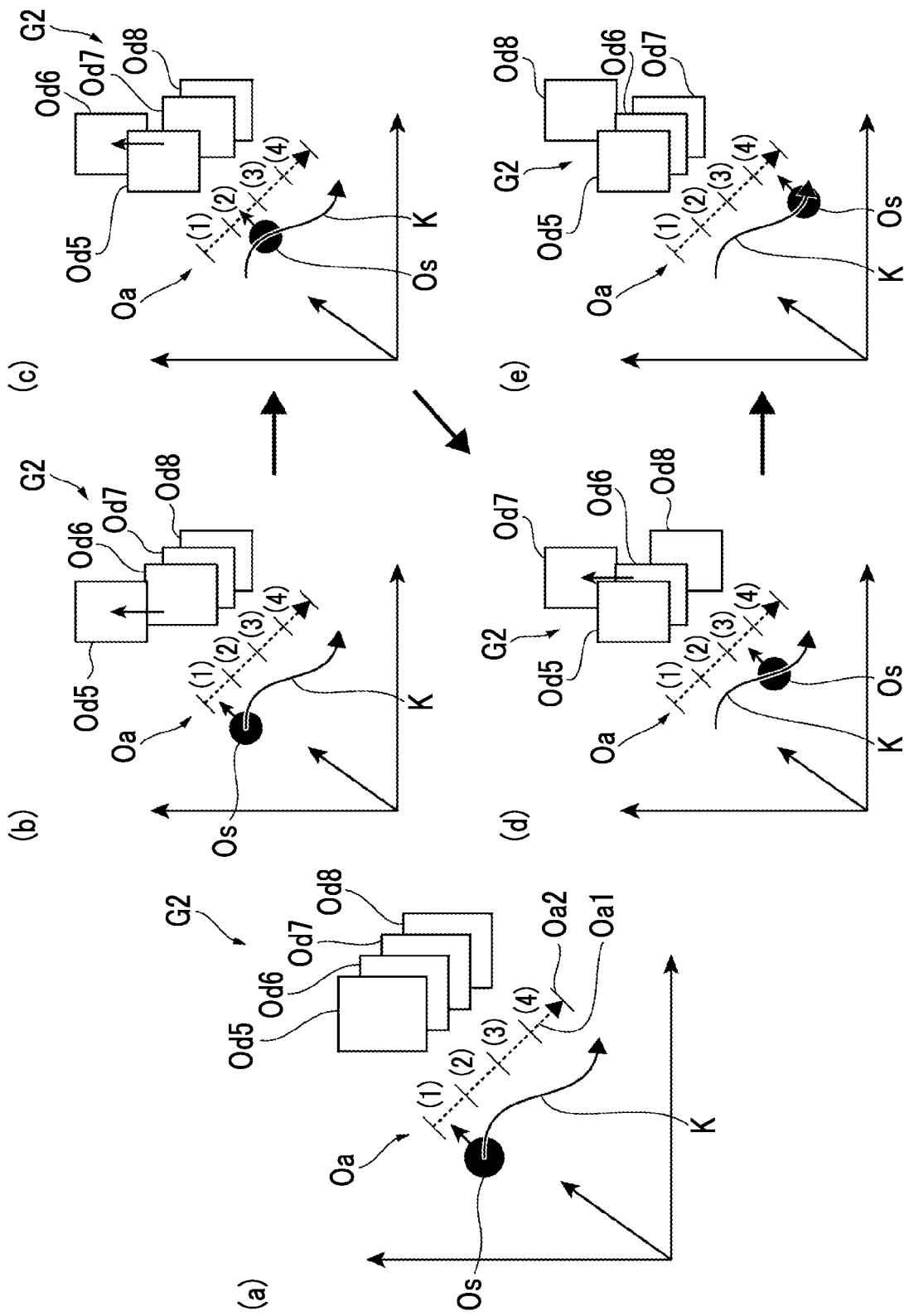
FIG. 8 is a view illustrating a method in which a specifying unit specifies one document object according to the movement of the operation object, and displays the one specified document object by sequentially moving the one specified document object with respect to other document objects.

(a) to (e) of FIG. 8 are views illustrating a method in which the specifying unit 140 specifies one document object Od, according to the movement of the operation object Os, and displays the one specified document object Od by sequentially moving the one specified document object Od with respect to other document objects Od.

Of these, (a) of FIG. 8 is a view illustrating a state before moving one specified document object Od. In a case where the second object group G2 is extracted, the creation unit 150 displays a guide object Oa, which is an object that guides the movement of the operation object Os in the VR space, near the second object group G2. This guide object Oa is an example of a guide area that guides the movement of the operation object Os in the VR space, when the user selects one document object Od from the second object group G2. The "guide area" is an area displayed for guiding the movement of the operation object Os, when the user selects one document object Od, in the VR space.

The guide object Oa is displayed, for example, as at least one of a line and a surface. (a) of FIG. 8 illustrates an example in which the guide object Oa is displayed using a straight line. The guide object Oa includes a dotted arrow Oa1 and dividing lines Oa2. The guide object Oa is divided by the number of document objects Od constituting the second object group G2, by the dividing lines Oa2, and each divided section corresponds to any of these document objects Od. In this case, the document objects Od constituting the second object group G2 are four document objects Od5 to Od8. Therefore, the guide object Oa is divided into four sections. In (a) of FIG. 8, these four sections are illustrated as sections (1) to (4). Then, the sections (1) to (4) correspond to the document objects Od5 to Od8, respectively. Note that (1) to (4) may be displayed as a part of the guide object Oa, but it is not always necessary to display (1) to (4). In a case of displaying, the display of (1) to (4) can be regarded as a part of the guide object Oa.

Here, the user operates the input device 30 such that the operation object Os moves along the guide object Oa. In (a) of FIG. 8, the movement of the operation object Os is illustrated as a locus K.

Then, as the operation object Os moves, the specifying unit 140 specifies one document object Od, and the creation unit 150 creates display information as illustrated in (b) to (e) of FIG. 8, and displays the one document object Od on the display screen 20a.

Specifically, the specifying unit 140 specifies the document object Od corresponding to the section closest to the operation object Os, in the set section, as one document object Od. Then, the creation unit 150 sequentially moves this one document object Od with respect to the other document objects Od.

For example, in a case where the operation object Os is at the position illustrated in (b) of FIG. 8, the section of the guide object Oa closest to the operation object Os is the section (1). In this case, the specifying unit 140 specifies the document object Od5 corresponding to the section (1) as one document object Od. Then, the creation unit 150 creates display information for displaying the document object Od5 by moving the document object Od5 with respect to other document objects Od6 to Od8. In this case, the document object Od5 moves upward with respect to the other document objects Od6 to Od8.

In a case where the operation object Os is at the position illustrated in (c) of FIG. 8, the section of the guide object Oa closest to the operation object Os is the section (2). In this case, the specifying unit 140 specifies the document object Od6 corresponding to the section (2) as one document object Od. Then, the creation unit 150 creates display information for moving the document object Od6 upward with respect to the other document objects Od5, Od7, and Od8. In this case, the document object Od5 returns to the original position illustrated in (a) of FIG. 8. That is, the document object Od5 temporarily moves according to the movement of the operation object Os, and is returned to the original position and displayed in the sections other than the section (1).

Similarly, in a case where the operation object Os is at the positions illustrated in (d) and (e) of FIG. 8, the sections of the guide object Oa closest to the operation object Os are the section (3) and the section (4), respectively. In this case, the specifying unit 140 specifies the document object Od7 and the document object Od8 corresponding to the section (3) and the section (4) as one document object Od. Then, the creation unit 150 creates display information for moving the document object Od7 and the document object Od8 upward with respect to other document object Ods. In this case, the document objects Ods other than the moving document object Od return to the original positions illustrated in (a) of FIG. 8.

The order in which the document objects Ods are sequentially moved is set according to the position of each document object od in the VR space. Further, in a case where the positions and postures of the plurality of document object Ods in the VR space are the same, the order is set according to the attributes such as the page numbers of the document objects Ods.

Figure 9A:
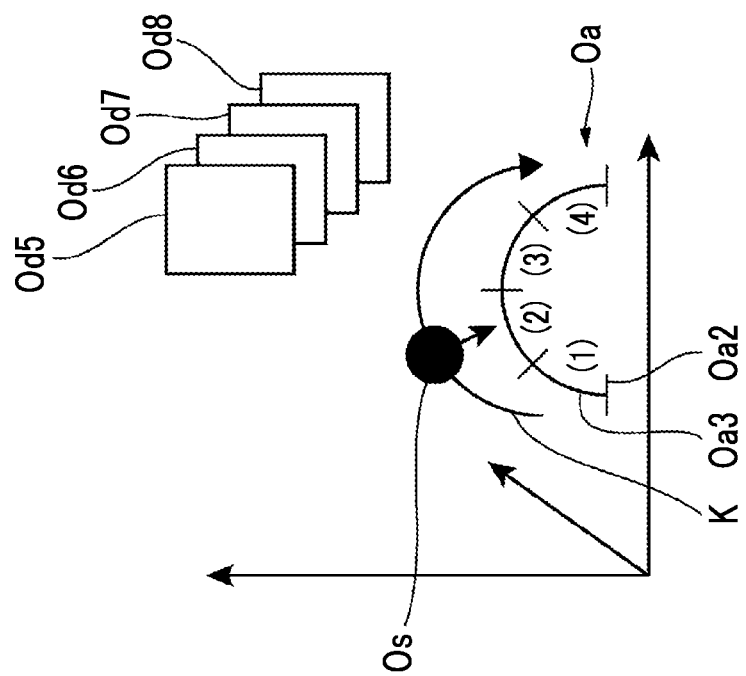
FIGS. 9A and 9B are views illustrating other forms of a guide object.
Figure 9B:
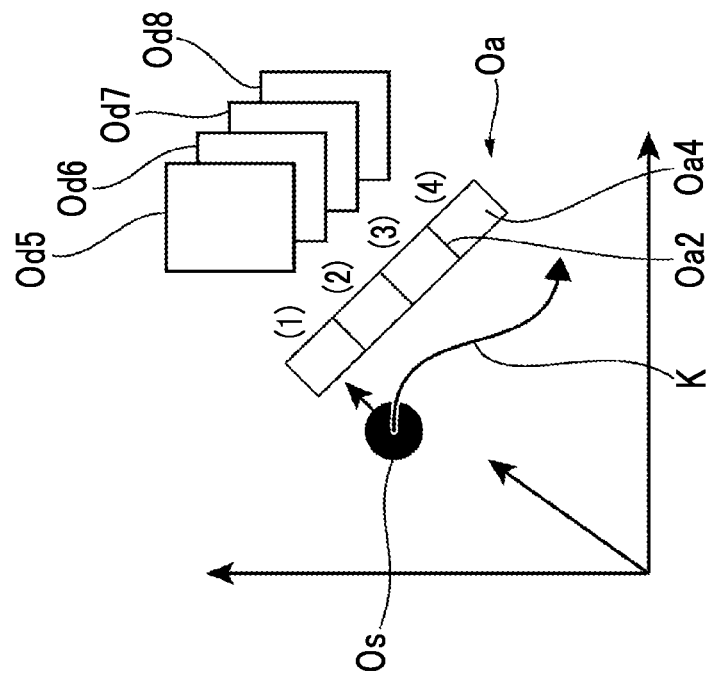

FIGS. 9A and 9B are views illustrating other modes of a guide object Oa.

Of these, FIG. 9A is a view illustrating a case where a curve is used and displayed as the guide object Oa. The guide object Oa includes a curve Oa3 and a dividing line Oa2. Then, as in the case of (a) of FIG. 8, the guide object Oa is divided into four sections, and the respective sections (1) to (4) correspond to the document objects Od5 to Od8, respectively.

Further, FIG. 9B is a view illustrating a case where the guide object Oa is displayed by using a surface. The guide object Oa includes a surface Oa4 and a dividing line Oa2. Then, as in the case of (a) of FIG. 8, the guide object Oa is divided into four sections. In FIG. 9B, these four sections are illustrated as sections (1) to (4). Then, as in the case of (a) of FIG. 8, the guide object Oa is divided into four sections, and the respective sections (1) to (4) correspond to the document objects Od5 to Od8, respectively.

Returning to FIG. 4 again, next, the specifying unit 140 determines whether or not the user has selected the moved document object Od (step S112). The selection of the document object Od can be performed by the user performing a predetermined operation by using the input device 30. When the input device 30 is a mouse-type input device, this operation is, for example, an operation such as clicking. In a case where the input device 30 is a user's hand or finger, this operation is a predetermined gesture. That is, as described above, in a case where this operation is performed when any of the document objects Od5 to Od8 is moved, the specifying unit 140 determines that the user has selected the moved document object Od.

As a result, in a case where the document object Od is selected (Yes in step S112), the specifying unit 140 ends the proximity document selection mode (step S113). Then, a predetermined process is executed on the selected document object Od (step S114). This process is, for example, enlarging and displaying the selected document object Od, displaying an edit screen, or the like.

On the other hand, in a case where the document object Od is not selected (No in step S112), the specifying unit 140 determines whether or not the end of the proximity document selection mode is selected (step S115). The proximity document selection mode can be ended by the user performing a predetermined operation by using the input device 30. In a case where the input device 30 is a user's hand or finger, this operation can be performed by a predetermined gesture.

As a result, in a case where the end of the proximity document selection mode is selected (Yes in step S115), the proximity document selection mode is ended and a series of processes is ended.

On the other hand, in a case where the end of the proximity document selection mode is not selected (No in step S115), the process returns to step S110.

In the above-described example, the document objects Od5 to Od8 are temporarily moved and displayed according to the movement of the operation object Os, but the present invention is not limited to this. For example, the specified document object Od may be highlighted or the color or shape may be temporarily changed. Further, the operation may be such as rotating the document object Od.

Further, the creation unit 150 may change the display mode of one specified document object Od. Specifically, the change in the display mode is, for example, a direction when one specified document object Od is moved and displayed.

Figure 10A:
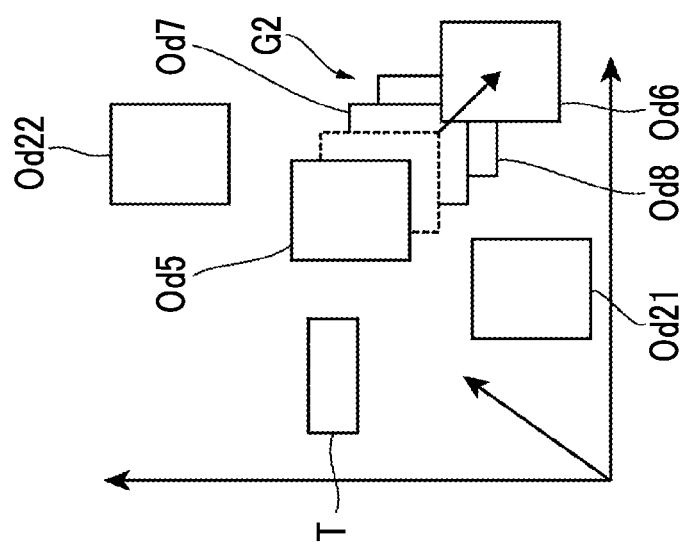
FIGS. 10A to 10C are views illustrating a mode in which a moving direction of the specified document object is changed.
Figure 10B:
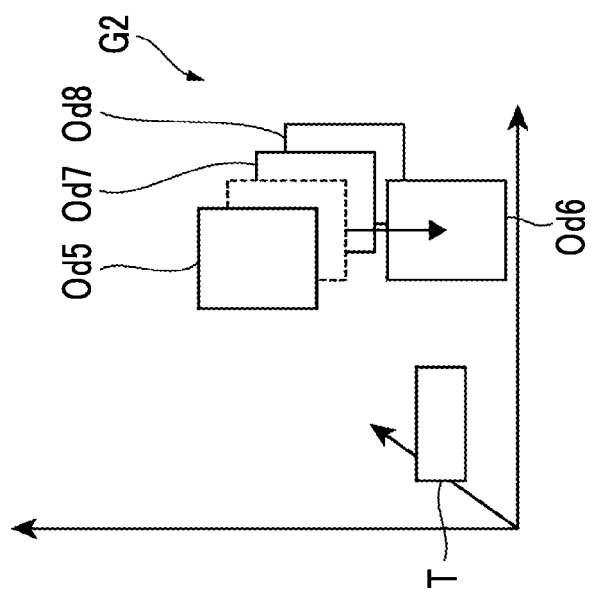
Figure 10C:
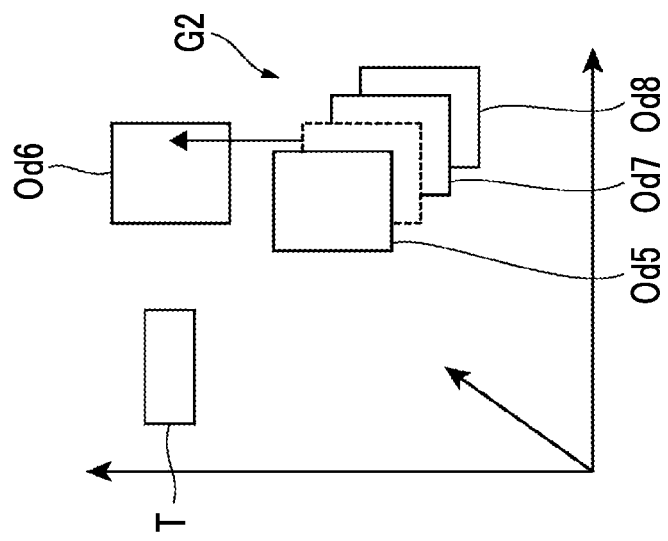

FIGS. 10A to 10C are views illustrating a mode in which a moving direction of the specified document object Od is changed.

Of these, FIGS. 10A and 10B are views illustrating a case of changing the moving direction of one specified document object Od, depending on the relationship between the position of the second object group G2 in the VR space and the position of the user's head T.

FIG. 10A is a view illustrating a case where the vertical center position of the second object group G2 is lower than the position of the user's head T in the VR space. In this case, the direction in which the document object Od6, which is one specified document object Od, moves is indicated. In this case, as illustrated, it is easier for the user to recognize the movement of the document object Od6 in a case where the document object Od6 is moved upward.

Further, FIG. 10B is a view illustrating a case where the vertical center position of the second object group G2 is higher than the position of the user's head T in the VR space. In this case, the direction in which the document object Od6, which is one specified document object Od, moves is indicated. In this case, as illustrated, it is easier for the user to recognize the movement of the document object Od6 in a case where the document object Od6 is moved downward.

Further, FIG. 10C illustrates a case where document objects Od21 and Od22, which are other document objects Od, are present around the document objects Od5 to Od8. In this case, the document object Od6, which is one specified document object Od, is preferably moved, for example, in a direction avoiding the document objects Od21 and Od22. In the illustrated example, the document object Od6 moves in a direction other than the direction in which the document objects Od21 and Od22 are present.

Further, the distance when the document object Od moves is preferably a distance in which the document object Od can be easily recognized by the user, for example.

That is, in a case where this distance is too small, it is difficult for the user to recognize that the document object Od has moved. Further, in a case where this distance is too large, the document object Od moves out of the range of the field of view of the user, and similarly, it becomes difficult for the user to recognize that the document object Od has moved.

Figure 11A:
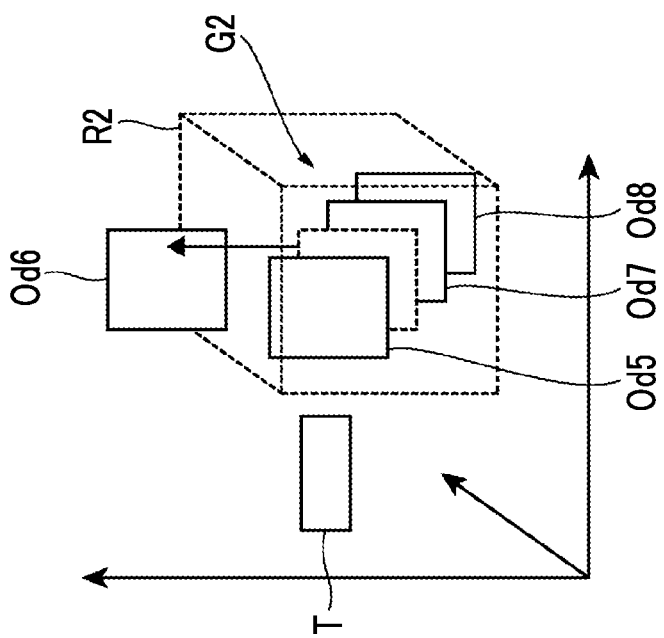
FIGS. 11A and 11B are views illustrating distances when the document object moves.
Figure 11B:
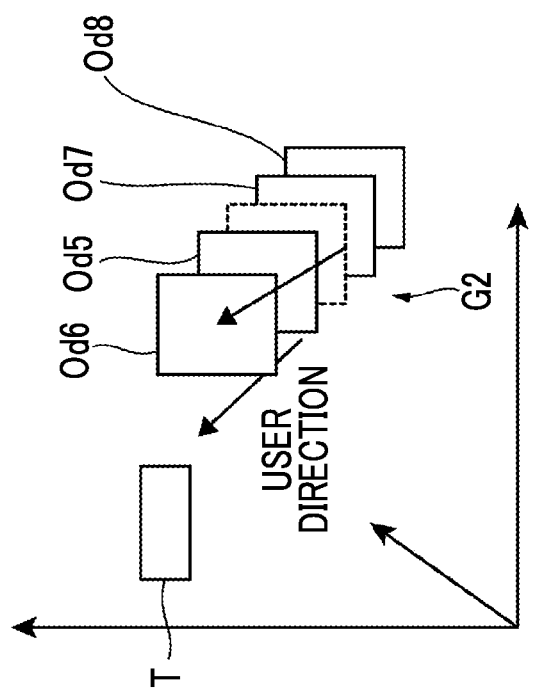

FIGS. 11A and 11B are views illustrating distances when the document object Od moves.

Of these, FIG. 11A is a view illustrating a method of preventing the distance when the document object Od is moved from being too small.

Here, in the VR space, a rectangular parallelepiped area R2 including the document objects Od5 to Od8 belonging to the second object group G2 is set. Then, the case where the document object Od6 is moved upward, beyond the range of the area R2, and at a distance in which the area R2 and the document object Od6 do not overlap is illustrated. In this case, the document object Od6 and the other document objects Od5, Od7, and Od8 do not overlap, and the user can easily recognize that the document object Od6 has moved.

Further, FIG. 11B is a diagram illustrating a method of preventing the document object Od from moving too far.

Here, the case where the document object Od6 is moved in the direction toward the user's head T in the VR space is illustrated. Further, the moving distance is set in front of the user's head T. In this case, since the document object Od6 moves toward the user, the document object Od6 does not move outside the range of the field of view of the user. In this case, the user can easily recognize that the document object Od6 has moved.

In this case, it can be said that the creation unit 150 changes the display mode of the one specified document object Od, depending on the relationship between the position of the second object group G2 in the VR space and the field of view of the user.

Further, the posture when the document object Od moves may be changed such that the user can more easily recognize the movement of the document object Od.

Figure 12B:
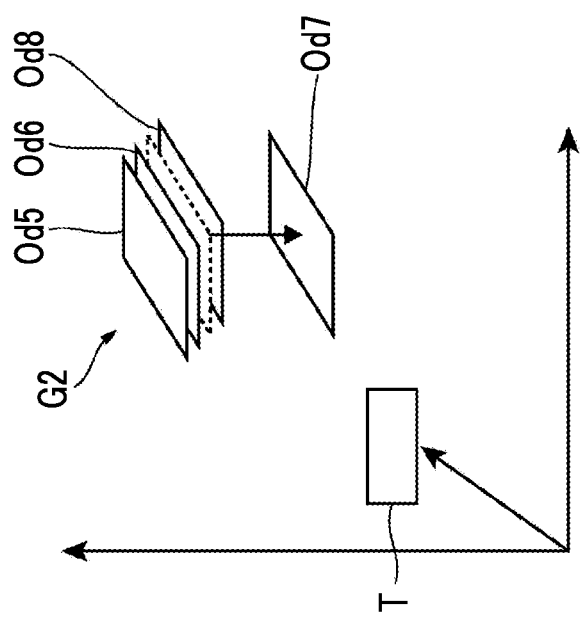
FIGS. 12A and 12B are views illustrating a case where a posture is changed when the document object moves.
Figure 12A:
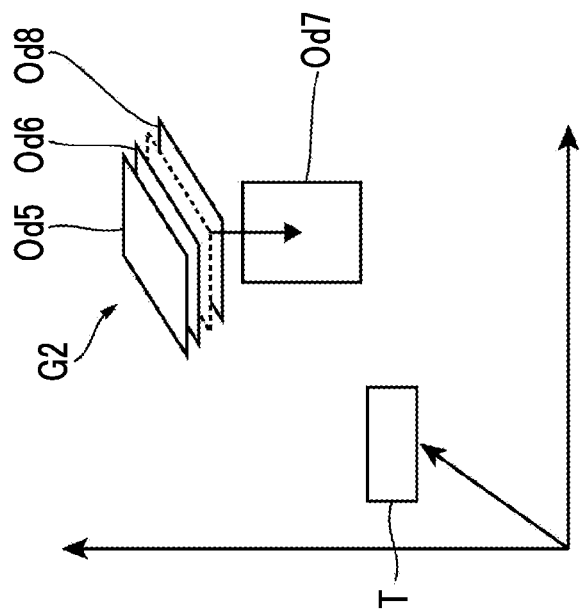

FIGS. 12A and 12B are views illustrating a case where a posture is changed when the document object Od moves.

Here, FIG. 12A is a view illustrating a case where the posture is not changed when the document object Od moves. In this case, the document object Od7 is moved, but since the display surface of the moved document object Od is not facing the user side, it is difficult for the user to recognize this display surface.

On the other hand, FIG. 12B is a view illustrating a case where the posture is changed when the document object Od moves. In this case, the posture of the display surface of the moved document object Od7 is changed so as to face the user side, and the user can easily recognize this display surface. The change in posture is temporary, and when the document object Od7 returns to the original position, the posture also returns to the original posture.

In this case, it can be said that the creation unit 150 displays the one specified document object Od by changing the posture of the one specified document object Od, according to the posture of the document objects Od configuring the second object group G2 in the VR space.

According to the information processing system 1 described above, the user can easily select the intended document object Od, even in a case where a plurality of document objects Ods are disposed close to each other in the VR space.

The display device 20 that displays the display information created by the information processing apparatus 10 described above can be regarded as an example of a display device that displays, in a VR space, a plurality of document objects Ods, and an operation object Os for operating the document objects Ods, based on input information from a user, and, according to an operation of the operation object Os in the VR space, displays one document object Od specified from the object group extracted from the plurality of document objects Ods, in an identifiable manner with respect to other document objects Ods other than the one document object Od.

In this case, when the user selects one document object Od from the object group, the display device 20 further displays the guide object Oa, which is an object that guides the movement of the operation object Os in the VR space.

Further, the display device 20 may display one document object Od by changing the display mode of the one document object Od, depending on the relationship between the position of the object group in the VR space and the position of the user's head T.

In the mode described above, after the first object group G1 is extracted, the second object group G2 is further extracted, but the second object group G2 may be extracted without extracting the first object group G1.

Further, in the mode described above, the case where the document object Od is selected as the object has been described, but without being limited to this, any object displayed in the VR space can be applied without particular limitation.

Further, in the mode described above, the guide object Oa is set by a line or a surface, but may be set by a space or as a solid-shaped object.

Further, in the mode described above, the display device 20 performs the display of the virtual space, that is, the display using Virtual Reality (VR), but without being limited to this, Augmented Reality (AR) or Mixed Reality (MR) may be used.

Program Description

The process performed by the information processing apparatus 10 according to the present exemplary embodiment described above is prepared as, for example, a program such as application software.

Therefore, the process performed by the information processing apparatus 10 in the present exemplary embodiment can be regarded as a program implementing on a computer, a function of displaying, in a VR space, a plurality of document objects Ods, and an operation object Os for operating the document objects Ods, based on input information from a user, a function of extracting an object group from the plurality of document objects Ods, a function of specifying one document object Od from the object group, according to an operation of the operation object Os in the VR space, and a function of displaying the one specified document object Od in an identifiable manner with respect to other document objects Ods other than the one document object Od.

The program that realizes the present exemplary embodiment can be provided not only by communication unit but also by storing the program in a recording medium such as a CD-ROM.

Although the present exemplary embodiment has been described, the technical scope of the present invention is not limited to the scope described in the above exemplary embodiment. It is clear from the description of the claims that the above-described exemplary embodiment with various modifications or improvements is also included in the technical scope of the present invention.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
display, in a virtual space, a plurality of objects, and an operation object for operating the plurality of objects, based on input information from a user;
extract an object group from the plurality of objects, wherein the object group comprises multiple objects that overlap with each other;
specify one object from the multiple objects of the object group, according to an operation of the operation object in the virtual space;
display the one specified object in a first location;
detect a point of view of the user; and
move the one specified object from the first location to a second location or a third location based on the point of view of the user, wherein the one specified object in the second location is less overlapped with the multiple objects than the one specified object in the first location, wherein move the one specified object from the first location to the second location or the third location comprising:
move the one specified object in a first direction from the first location to the second location if a relationship between a position of the multiple objects in the virtual space and a position of the point of view of the user is a first relationship; and
if the relationship between the position of the multiple objects in the virtual space and the position of the point of view of the user is a second relationship, move the one specified object in a second direction from the first location to the third location.

2. The information processing apparatus according to claim 1, wherein
the processor is configured to extract the multiple objects which are present in a user's visible range, as the object group.

3. The information processing apparatus according to claim 1, wherein
the processor is configured to extract the object group from the plurality of objects, according to a position of the operation object.

4. The information processing apparatus according to claim 1, wherein
the processor is further configured to display a guide object, which is an object that guides the movement of the operation object in the virtual space, as the guide area.

5. The information processing apparatus according to claim 4, wherein the guide object is displayed as at least one of a line and a surface.

6. The information processing apparatus according to claim 4, wherein
the guide object is divided by the number of objects constituting the object group, and each divided section corresponds to any of the multiple objects, and
the processor is configured to specify and display the one specified object corresponding to a section closest to the operation object, in the section, as the one object, in an identifiable manner with respect to the other objects.

7. The information processing apparatus according to claim 1, wherein
the processor is configured to change a display mode of the one specified object, depending on a relationship between a position of the object group in the virtual space and a position of a user's head.

8. The information processing apparatus according to claim 7, wherein
the processor is configured to change a display mode of the one specified object, depending on a relationship between a position of the object group in the virtual space and a field of view of the user.

9. The information processing apparatus according to claim 7, wherein the processor is configured to display the one specified object by changing a posture of the one specified object, according to postures of the objects constituting the object group in the virtual space.

10. The information processing apparatus of claim 1, wherein the processor is further configured to set a guide area, that guides a movement of the operation object in the virtual space, to specify the one object from the object group as the operation object moves along the guide area.

11. The information processing apparatus of claim 1, wherein the processor is further configured to:
    in response to moving the one specified object in the first direction or the second direction, the multiple objects, not including the one specified object, are stationary as displayed within the virtual space.

12. A display device configured to
    display, in a virtual space, a plurality of objects, and an operation object for operating the objects, based on input information from a user;
    display in a first location one object specified from multiple objects of an object group extracted from the plurality of objects, according to an operation of the operation object in the virtual space, wherein the object group comprises the multiple objects that overlap with each other;
    display the virtual space based on a detected point of view of the user; and
    display the one specified object moved from the first location to a second location or a third location based on the detected point of view of the user, wherein the one specified object in the second location is less overlapped with the multiple objects than the one specified object in the first location, wherein display the one specified object from the first location to the second location or the third location comprising:
        display moving the one specified object in a first direction from the first location to the second location if a relationship between a position of the plurality of objects in the virtual space and a position of the point of view of the user is a first relationship; and
        if the relationship between the position of the plurality of objects in the virtual space and the position of the point of view of the user is a second relationship, display moving the one specified object in a second direction from the first location to the third location.

13. An information processing system comprising:
    a display device that displays a virtual space; and
    the information processing apparatus of claim 1.

14. A non-transitory computer readable medium storing a program causing a computer to execute a process, the process comprising:
    displaying, in a virtual space, a plurality of objects, and an operation object for operating the plurality of objects, based on input information from a user;
    extracting an object group from the plurality of objects, wherein the object group comprises multiple objects that overlap with each other;
    specifying one object from the multiple objects of the object group, according to an operation of the operation object in the virtual space;
    displaying the one specified object in a first location;
    detecting a point of view of the user; and
    having determined that a relationship between a position of the plurality of objects in the virtual space and a position of the point of view of the user is a first relationship, moving the one specified object in a first direction from the first location to a second location; and
    having determined that the relationship between the position of the plurality of objects in the virtual space and the position of the point of view of the user is a second relationship, moving the one specified object in a second direction from the first location to a third location.

15. A non-transitory computer readable medium storing a program causing a computer to execute a process, the process comprising:
    displaying, in a virtual space, a plurality of objects, and an operation object for operating the plurality of objects, based on input information from a user;
    extracting an object group from the plurality of objects, wherein the object group comprises multiple objects that overlap with each other;
    specifying one object from the multiple objects of the object group, according to an operation of the operation object in the virtual space;
    displaying the one specified object in a first location;
    detecting a point of view of the user; and
    moving the one specified object from the first location to a second location based on the point of view of the user, wherein the one specified object in the second location is less overlapped with the multiple objects than the one specified object in the first location and a first distance between the one specified object in the first location and the multiple objects is less than a second distance between the one specified object in the second location and the multiple objects.

16. The non-transitory computer readable medium of claim 15, wherein the wherein the one specified object in the second location is less overlapped with the multiple objects than the one specified object in the first location comprising:
    the one specified object in the second location is no longer overlapped with the multiple objects then the one specified object in the first location.

* * * * *